United States Patent [19]

Cone

[11] 4,001,493
[45] Jan. 4, 1977

[54] SINGLE LENS, MULTI-BEAM SYSTEM AND METHOD FOR HIGH RESOLUTION RECORDING OF INFORMATION ON A MOVING RECORDING MEDIUM AND ARTICLE

[75] Inventor: Donald R. Cone, Palo Alto, Calif.

[73] Assignees: Nihon Denshi Kabushiki Kaisha; Sharp Kabushiki Kaisha, both of Japan

[22] Filed: Sept. 3, 1974

[21] Appl. No.: 502,558

[52] U.S. Cl. .................. 358/127; 179/100.3 V; 346/158; 358/128
[51] Int. Cl.² ............................. H04N 5/76
[58] Field of Search .......... 178/6.6 A, 6.6 R, 6.7 A, 178/6.6 DD; 179/100.3 V, 100.3 C, 100.3 B, 100.3 T, 100.31, 100.41 L; 346/74 EB, 74 J; 340/173 LM

[56] References Cited

UNITED STATES PATENTS

| | | | |
|---|---|---|---|
| 2,108,815 | 2/1938 | Gille | 179/100.3 C |
| 3,381,086 | 4/1968 | Moss | 179/100.3 V |
| 3,648,257 | 3/1972 | Wiese | 178/6.6 A |
| 3,688,025 | 8/1972 | Whittemore | 178/6.7 A |
| 3,701,847 | 10/1972 | Miyauchi | 178/6.7 A |
| 3,737,589 | 6/1973 | Redlich | 178/6.7 A |
| 3,800,099 | 3/1974 | Dickopp | 178/6.6 A |
| 3,842,194 | 10/1974 | Clemens | 178/6.6 A |
| 3,902,010 | 8/1975 | Goshima | 179/100.3 V |

OTHER PUBLICATIONS

"The Philips (VLP) System," by Compaan, Philips Tech. Rev. 33, No. 7, Oct. 1973, p. 178.
Communications Systems: An Intro. to Signals and Noise in Electrical Communications, by A. Carlson, McGraw-Hill Book Co., c. 1968, pp. 289-290.

Primary Examiner—Bernard Konick
Assistant Examiner—Alan Faber
Attorney, Agent, or Firm—Flehr, Hohbach, Test, Albritton & Herbert

[57] ABSTRACT

A wideband beam exposure recording system including a recording beam directed along a path. An object mask having spaced apertures formed therein is positioned in the path of the beam to provide spaced and shaped beams along said path. Means is provided for selectively and independently controlling each of said beams as a function of the information to be recorded. A conductive plate lens having a single aperture formed therein is spaced from the object mask and the entrance of the aperture formed in said plate lens is positioned in the path of the spaced beams. A movable target, beam-sensitive surface is positioned adjacent the exit of the lens and voltage means is applied between the lens and the target for imaging the beams on the target in spaced relationship. The article provided by the recording system and method is also disclosed.

9 Claims, 4 Drawing Figures

SINGLE LENS, MULTI-BEAM SYSTEM AND METHOD FOR HIGH RESOLUTION RECORDING OF INFORMATION ON A MOVING RECORDING MEDIUM AND ARTICLE

CROSS-REFERENCES TO RELATED APPLICATIONS

CONTACTING PICKUP OPTICAL REPRODUCTION SYSTEM, Ser. No. 502,810, filed Sept. 3, 1974, invented by Philip J. Rice, Louis J. Schaefer and Hugh F. Frohbach, and assigned to common assignees.

MULTIPLEXED RECORDING TECHNIQUE, Ser. No. 502,559, filed Sept. 3, 1974, invented by Louis J. Schaefer and assigned to common assignees.

BACKGROUND OF THE INVENTION

This invention relates generally to the high density recording of wideband information on a recording medium. More particularly, this invention relates to the high density recording of information such as composite video and sound signals on a video disc.

Systems for recording and storage of wideband information which is carried on an information path on a recording medium, such as wideband information stored on a video disc, are known in the art. Present systems however, generally record at only 1/10 to 1/50 of the real time information rate and further have limited information packing density on the recording medium. Thus there is a need for a real time or near real time recording system, method and an article which provides improved information packing density and is capable of mastering replica disc copies.

SUMMARY OF THE INVENTION AND OBJECTS

Accordingly, it is a general object of the present invention to provide an improved wideband recording system and method for recording information on a information path formed on a recording medium.

It is a particular object of the present invention to provide a system and method for video disc recording at real time or near real time information rates and to provide a recorded video disc having improved information packing density.

The foregoing and other objects of the invention are achieved in a wideband beam exposure recording system including a recording beam directed along a path. An object mask having spaced apertures formed therein is positioned in the path of the beam to provide spaced and shaped beams along said path. Means is provided for selectively and independently controlling the positioning of each of the beams as a function of the information to be recorded. A conductive plate lens having a single aperture formed therein is spaced from the object mask and the entrance of the aperture formed in the plate lens is positioned in the path of the spaced beams. A movable target, beam sensitive surface is positioned adjacent the exit of the lens and voltage means is applied between the lens and the target for imaging the beams on the target in spaced relationship. The article provided by the recording system is also disclosed.

DESCRIPTION OF THE PREFERRED EMBODIMENTS

A single lens multi-beam system for recording wideband information, such as composite audio, chroma, and luminance video information on a disc is shown in the accompanying Figures. Briefly, in general overview, an electron beam writes directly on an electron-sensitive resist formed on a disc to provide high resolution, high packing density information storage at real time or near real time. Subsequently the patterned resist is developed to form a negative utilized for positive etching of pits in the underlying disc. As will be seen, information is recorded, as a function of the surface-storage elements or pits which have variable width and spacing along an information path carried on the disc. The disc having pits formed therein may then be utilized to form an intermediate disc which is used for multiple pressing of replica discs.

Figure 1:
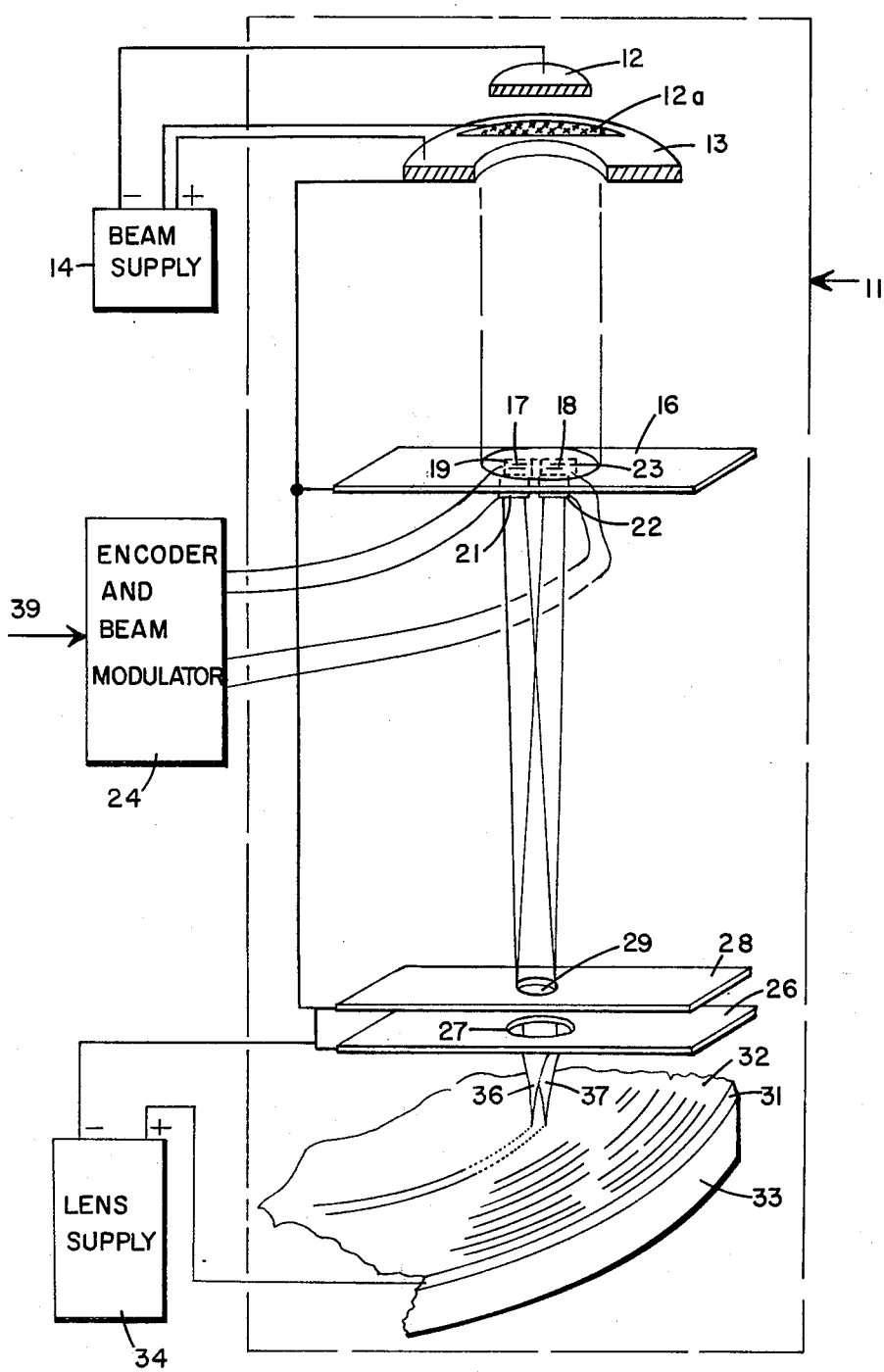
FIG. 1 is a symbolic block diagram of the single lens, multi-beam recording system.

Referring to FIG. 1, enclosure 11 provides a vacuum environment of approximately $10^{-7}$ Torr substantially free of carbon, water, vapor, and oil. The electron beam source includes cathode 12, control electrode 12a and first anode 13 spaced from the cathode and having an aperture formed therein, and beam supply 14. Supply 14 has a negative terminal connected to cathode 12 an additional terminal connected to electrode 12a and has a positive terminal connected to anode 13. The beam brightness as well as other interrelated parameters of lens aperture, resist sensitivity and disc speed may of course be traded-off. A beam brightness of approximately $10^4 A/cm^2$-steradian is preferred. Several types of cathodes may be used, with a dispenser cathode preferred because of its well-known predictability, stability, lifetime and intrinsic brightness. The supply 14 serves to provide, for example, approximately 600 electron Volts, for the dispenser cathode. Thoriated tungsten and lanthanum hexaboride cathodes also may be used to provide an intrinsic brightness of the same order of magnitude.

An object mask 16 having spaced apertures 17 and 18 is positioned in the path of the electron beam, the beam having a sufficient beam width to illuminate and pass through apertures 17 and 18. Apertures 17 and 18 may be rectangular in shape of approximately 250 micrometers by 50 micrometers and aligned to produce the desired rectangular patterns on the disc surface. As will be seen, the demagnification of approximately 250 times provided by the system forms a 1.0 by 0.2 micrometers image on the disc surface. Spaced deflection plates 19 and 21 are provided in the beam path provided by aperture 17 and positioned immediately adjacent mask 16. Plates 19 and 21 are connected to a first output of encoder and beam modulator 24. A second set of deflection plates 22 and 23 are similarly provided adjacent mask 16 and in the path of the beam provided by aperture 18. Plates 22 and 23 are connected to a second output of encoder and beam modulator 24. Beam modulator 24 may provide an electrostatic modulation of the spaced beams exiting apertures 17 and 18. Spaced beams from spaced apertures 17 and 18 flood and are incident the entrance of an electron-optical lens 26 having aperture 27. An additional set of deflection plates (not shown) may also be provided adjacent the object mask to provide microdeflection for full or partial tracking of the beams within a predetermined information path exposed on the recording medium.

Lens plate 26 may be a conductive plate positioned in the path of the beams and spaced approximately 12.5 inches from object mask 16. An aperture limiting plate 28 having an aperture 29 formed therein of smaller size than lens aperture 27 may be positioned in said path between lens plate 26 and mask 16. The aperture limiting plate 28 may be used to limit the electrons to approximately the center 50% of the lens to ensure high resolution by eliminating those electrons that would normally travel close to the highly aberrating edge of the lens plate 26 and electrically connected to said lens plate.

Conductive disc 31, having an electron-sensitive resist layer 32 formed on the upper surface thereof is positioned on turntable 33. The upper surface of disc 31 and resist 32 may be positioned approximately 0.1 inches from lens plate 26. Resist 32 may be a positive electron resist, such as poly (methyl methacrylate), having a sensitivity of approximately $10^{-4}$ coulombs/cm$^2$. This resist may be exposed at a linear velocity as high as 1.6 microns/microsecond which corresponds to a disc speed of 100rpm. This represents approximately half real-time recording of the disc which may subsequently be reproduced at 225rpm as disclosed in cross-referenced application CONTACTING PICKUP OPTICAL REPRODUCTION SYSTEM.

A lens supply voltage means 34 is provided and has a negative terminal connected to aperture plate 26 and a positive terminal connected to conductive disc 31. Disc 31 and the resist 32 thereon form the target electrode of the electron beam system. Lens supply 34 may provide approximately 5,000 volts. This potential provides a corresponding electrostatic field which results in an electron-optical lens being formed adjacent aperture 27, as will be hereinafter described. The ratio of the lens supply 34 potential and the beam supply 14 is important for proper focus with the actual levels dependent on insulation, beam size, resist sensitivity and resist resolution. The spaced and shaped beams heretofore provided by apertures 17 and 18 and which are incident to the entrance of electron lens, exit the lens to form spaced, de-magnified beams 36 and 37 which image and impinge on resist 32.

As will be presently seen, beams 36 and 37 expose electron sensitive resist recording surfaces along the information path carried by disc 31. Susbsequently the resist when developed is utilized as a negative for etching pits in the underlying disc. Although not shown, additional means may be provided to position and maintain alignment of beams 36 and 37 on the recording surfaces of disc 31. An additional set of deflection plates (not shown) may also be provided adjacent the object mask to provide microdeflection control for full or partial tracking of the beams within a predetermined information path on the recording medium. Alternately means adjacent beams 36 and 37 may be used to detect the magnitude of secondary electrons that is electrons emitted because of the impact of beams 36 and 37 striking the grooved surface formed in disc 31. The magnitude of secondary electrons, may then be used, in combination with positioning means to ascertain that the recording beams 36 and 37 are properly aligned on the recording surfaces of disc 31.

The electron beam recording system may be adjusted to provide the following parameters:

| | |
|---|---|
| Spot size: | 1 micrometer, shaped, aperture image |
| Beam Current: | 1 microampere |
| Beam voltage: | 5–15kV |
| Deflection: | electrostatic, for both beam correction and modulation |
| Spherical abberation: | 0.1 micrometers |
| Astigmatism: | 10% |
| Current stability: | better than 5%/hour |
| Beam position stability: | 1 micrometer/hour |
| Spot size stability: | ± 10%/hr |
| Cathode lifetime | 2 × 10$^4$ hours |
| Depth of focus: | 100 micrometers |
| Beam brightness: | approximately 10$^5$ A/cm$^2$-str |

Figure 2:
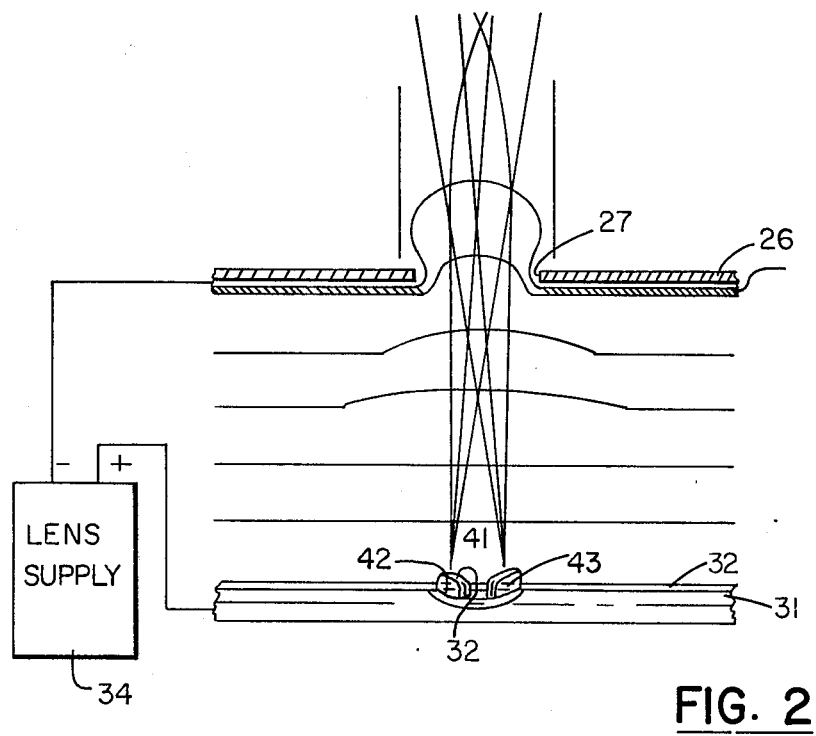
FIG. 2 is a cross-sectional view of the electron-optical lens of FIG. 1 showing the exposure of the resist formed on the recording surfaces.

Referring to FIG. 2, a detailed view of the electron optical lens is shown. The electron-optical lens comprises a simple, aperture lens. As previously described lens plate 26 having aperture 27 therein is positioned in the path of the converging electron beams. Further, plate 26 is spaced from conductive disc 31 and resist 32 in the electron beam system. Supply 34 has a negative terminal connected to lens plate 26 and a positive terminal connected by suitable contact means to disc 31.

Disc 31 has a predetermined information path on its surface. The path may be a flat portion of the disc surface or a groove formed therein. Grooves 41, for example, may be formed having spaced recording surfaces 42 and 43 formed in the confronting walls of said grooves. Resist 32 is uniformally formed on the recording surfaces. The supply 34 potential creates an electrostatic field having equi-potential field lines spaced substantially parallel to the disc 31 near the disc and becoming more convex in shape approaching the aperture. Moreover, the lines extend to form a convex, lens-shaped field immediately adjacent the sources side of aperture 27. The entrance field, that is the field nearest the beam source, is substantially zero in magnitude. The lens supply potential creates a uniform accelerating field on the exit side of aperture 27 to cause the electrons to thereby focus a real image of the previously described apertured object mask on the resist 32 carried by the respective recording surfaces 42 and 43.

Figure 3A:
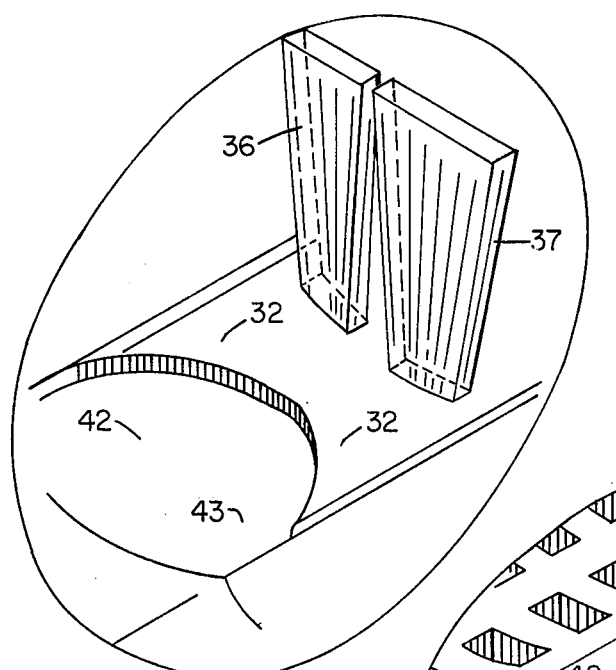
FIG. 3a is an isometric view of a portion of a blank video disc.

Referring to FIG. 3a the initial blank disc is shown prior to recording exposure of resist 32. Once exposed the patterned resist is processed to form patterned pits in the recording surfaces, FIG. 3b. Groove 41 is shown formed in the surface of disc 31. Recording surfaces 42 and 43 are formed in the confronting side walls and have a layer of electron-sensitive resist 32 formed thereon. Groove 41 may be approximately 6 micrometers in width. The pits may be separated abut or overlap in the recording surface, and may be approximately 0.5 × 2 micrometers, and 0.5–1 micrometers in depth when etched. The pits may be spaced approximately one micrometer apart.

Turning to operation of the system, the electron beam source, including cathode 12, control electrode 12a, first anode 13, and supply 14 provides an electron beam directed along a path. Object mask 16 is placed within said path and has apertures 17 and 18 to form spaced rectangular-shaped electron beams which continue along said path. Encoder and demodulator 24 provides electrostatic bias by means of deflection plates 19 and 21 and plates 22 and 23 that can cause the spaced beams to be deflected away from aperture 27. With no deflection the beam exposes the resist. On the other hand, deflecting the beam provides no exposure and non-record operation. The spaced shaped beams diverge at the exit of the electron lens, are focused and impinge on electron-sensitive resist 32 on recording surfaces 42 and 43. The turntable 33 is set in motion at near real-time approximately 100rpm. Next, the composite video and audio signal 39 including audio, chroma, and luminance signals is applied to encoder and demodulator 24. Encoder and demodulator 24 provide controlling deflection potentials to plates 19, 21, and 22, 23 in accord with the information to be recorded. The additional set of microdeflection deflection plates, if included, provides microdeflection of the beam while recording for full or partial tracking of the beam within the predetermined information path on the recording medium. The beam micropositioning may be used to correct for disc and other system positioning inaccuracies. It is further understood that the microdeflection may provide positioning and partial or "semi-tracking" of the beam as desired.

The encoded information is thus exposed on the resist surface 32 or controlled in accord with the desired pit width and pit spacing along the recording surfaces 42 and 43. Beams 36 and 37 may thus be independently controlled to impress information on the resist surface on the disc 32. The multiplexing technique utilized to provide a high density, high resolution information storage capacity of approximately 5.75 MHz is disclosed in cross-referenced and related application MULTIPLEXED RECORDING TECHNIQUE.

Figure 3B:
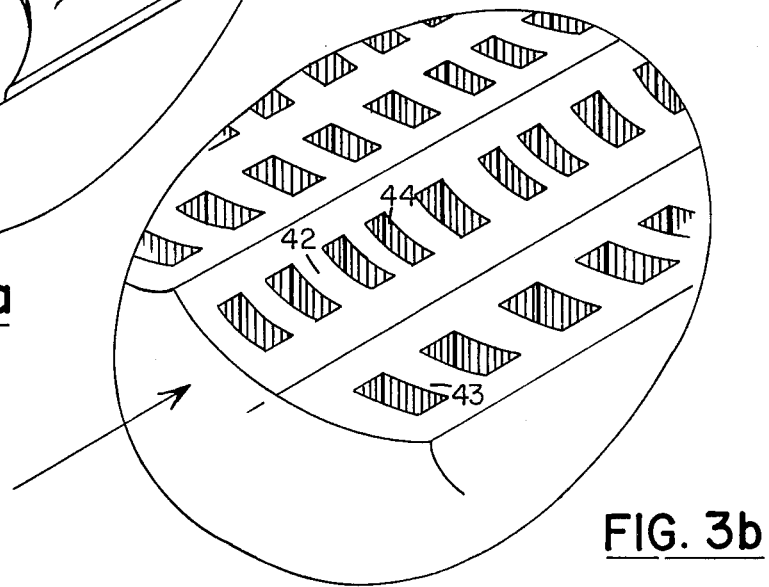
FIG. 3b is an isometric view of a recorded disc in accord with the present invention.

Referring to FIG. 3b, once the resist is exposed the recording surfaces 42 and 43 the resist is conventionally developed to provide a negative. Next the negative is used to etch a positive pattern of pits in the underlying disc. Etching solution is applied and using the resist as a mask, pits 44 are formed in the underlying disc. The pits may be approximately 0.5 × 2 micrometers in size and etched to a depth of 0.5–1 micrometers. The pits may be spaced approximately one micrometer apart. The etched disc may then be conventionally used to form an intermediate disc which then is utilized to press replica discs.

Thus it is apparent that there has been provided a wide band electron beam recording system and method and a recorded article provided thereby. The recording system and wideband disc provided thereby has a wide variety of applications particularly in the recording and storage of a wideband information. Specifically, wideband digital information or composite video and audio information may be carried as surface storage on a disc, including audio, chroma and luminance information suitable for recording and storage of wideband television and other video applications.

I claim:

1. In a method for electron beam recording of wideband information on a recording medium, providing a recording electron beam directed along a path, forming spaced beams by intercepting said beam with an object mask having spaced apertures formed therein, selectively and independently controlling the positioning of each of said electron beams as a function of the information to be recorded, focusing said beams on the recording medium by a single electromagnetic lens to image the beams leaving said lens on said recording medium and moving said recording medium to expose sequential portions of said medium to said electron beams.

2. A method as in claim 1 wherein said recording medium includes an electron beam sensitive medium carried on the surface thereof to be exposed by the electron beams together with the additional steps of forming a negative from said electron beam exposed electron beam sensitive medium, forming information pits in the additional medium utilizing said negative.

3. The article formed by the recording method of claim 2.

4. A method as in claim 2 together with the additional step of reproducing said stored information including forming a replica layer on the surface of said recording medium and additional storage medium and removing said layer intact from said medium.

5. In a wideband beam recording system, an electron source providing a recording electron beam directed along a path, an object mask having spaced apertures formed therein positioned in the path of the beam, said beam having a beam diameter sufficient to illuminate said apertures to provide spaced and shaped beams exiting from said apertures along said path, means cooperating with each of the spaced and shaped beams for selectively and independently controlling the positioning of each of said beams as a function of the information to be recorded, a conductive plate lens having a single aperture formed therein spaced from said object mask further along the beam path, said conductive plate lens positioned so that said aperture is positioned in the path of said spaced beams, a movable recording surface positioned adjacent the exit of said aperture and voltage means applied between said conductive plate lens and said surface to form a lens for focusing and imaging the beams on said target in a spaced relationship.

6. The system as in claim 5 together with an aperture limiting conductive plate having an aperture formed therein of smaller size than said lens aperture, said plate positioned between said conductive plate lens and said object mask adjacent to said lens plate and electrically connected thereto.

7. A system as in claim 6 wherein said recording beam is provided by the combination of a dispenser cathode, an anode and a beam supply voltage means and wherein said means for selectively and independently controlling the positioning of each of the beams as a function of the information to be recorded is an encoder and beam modulator in combination with spaced deflection plates positioned at the beam exit from said object mask and wherein said encoder and beam modulator additionally provides bias for positioning the beams at the entrance of said lens plate and wherein said movable target is formed of a conductive disc and wherein said disc has an electron-sensitive layer formed thereon.

8. A system as in claim 7 wherein said electron-sensitive layer is formed of poly-methylmethacrylate.

9. A system as in claim 7 together with addition positioning means including beam deflecting plates adjacent said object mask for micropositioning and tracking said beam on said surface within a predetermined information path.

* * * * *